United States Patent [19]

Burk

[11] Patent Number: 4,796,209

[45] Date of Patent: Jan. 3, 1989

[54] RANDOM INVENTORY SYSTEM

[75] Inventor: David L. Burk, Pittsburgh, Pa.

[73] Assignee: Allegheny Ludlum Corporation, Pittsburgh, Pa.

[21] Appl. No.: 878,865

[22] Filed: Jun. 26, 1986

[51] Int. Cl.$^4$ .......................... B65G 1/10; G06F 15/24
[52] U.S. Cl. .................................... 364/559; 364/403; 364/478; 235/385; 414/273
[58] Field of Search ............... 364/559, 478, 444, 403; 414/273, 277, 279; 235/385; 340/825.49, 685, 825.22; 209/608-610

[56] References Cited

U.S. PATENT DOCUMENTS

| | | | |
|---|---|---|---|
| 3,719,287 | 3/1973 | Billingsley et al. | 414/273 |
| 3,786,944 | 1/1974 | Daigle et al. | 414/273 |
| 3,958,102 | 5/1976 | Burt | 414/273 |
| 4,385,028 | 5/1983 | Salamen | 340/685 |
| 4,415,975 | 11/1983 | Burt | 364/444 |
| 4,519,522 | 5/1985 | McElwee | 414/273 |
| 4,642,017 | 2/1987 | Fenn | 414/273 |

Primary Examiner—Parshotam S. Lall
Assistant Examiner—David Goldman
Attorney, Agent, or Firm—Patrick J. Viccaro

[57] ABSTRACT

A method for locating and retrieving a randomly placed object, such as a steel coil, in a warehouse, such as a crane bay of a steel mill storage warehouse. The method comprises the steps of attaching an indicia identification to the object, recording the indicia of identification, determining the coordinates of the object, indexing the indicia to the coordinates, and retrieving the object with a transporting means.

25 Claims, 3 Drawing Sheets

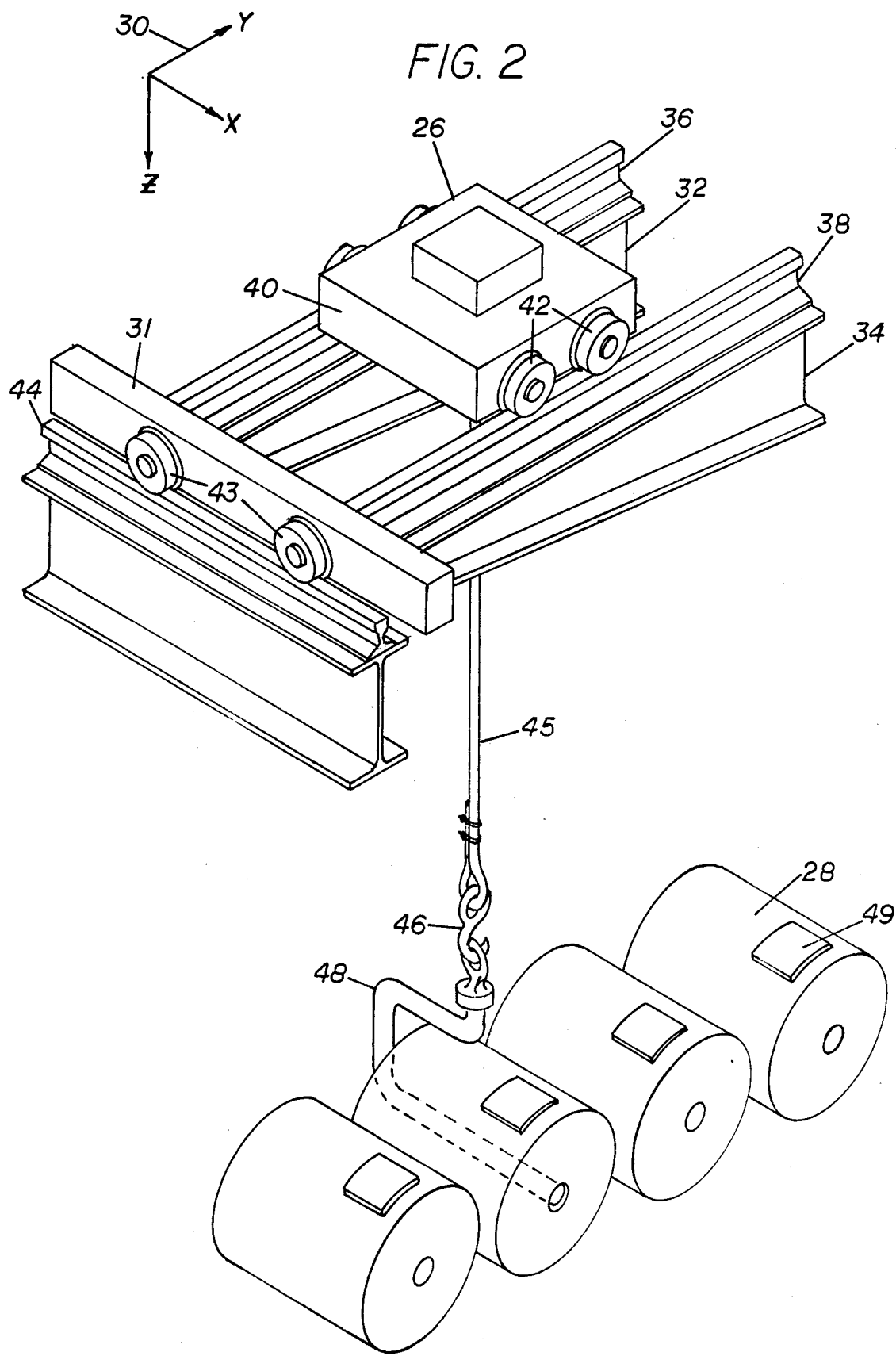

RANDOM INVENTORY SYSTEM

BACKGROUND OF THE INVENT

1. FIELD OF THE INVENTION

This invention relates generally to inventory systems, and more specifically to a method for locating and retrieving a randomly placed object.

2. DESCRIPTION OF THE PRIOR ART

The use of automated inventory and retrieval systems has become a necessity for many large-volume processes in which a large number of items must be stored for a period of time. Such processes include assembly line operations wherein a large number of identical items are temporarily stored prior to subsequent non-identical processing as well as retrieval systems where a large number of unique items must be stored in a manner such that quick retrieval is allowed.

In the prior art, an apparatus and method for positioning a vehicle at a storage bin in an automated storage and retrieval system is disclosed in U.S. Pat. No. 4,415,975, Burt. A retrieval vehicle is positioned at a storage bin in a three-dimensional rack structure containing objects in discrete storage bins of the rack structure. The method described by Burt allows precise positioning of the retrieval vehicle given an already known location of the stored object. This known method, however, requires a rigid rack structure, and presupposes that the location of the stored object in the rack structure is already known. Frequently, however, storage areas do not contain rack structures nor are the storage locations of the objects already known so as to allow positioning of a retrieval vehicle. For example, in steel finishing facilities, steel coils are temporarily stored in a random manner in production or storage bays in any available space.

In the manufacture of various alloy products, such as stainless steel sheets or silicon steel sheets, the product at several intermediate stages of production and the final product is in the form of a coil. These coils are placed in holding areas next to the production units and/or, when space permits in-storage bays prior to further processing or, after processing is completed, prior to shipment to a customer. To move the coils, use is often made of an overhead crane. The overhead crane embodies a crane bridge that moves through the bay warehouse along parallel tracks thereby providing movement back and forth in one direction. The crane further embodies a crane trolley that moves horizontally along the crane bridge in a direction of travel perpendicular to that of the crane bridge, thereby providing movement back and forth in a second direction. The crane bridge and trolley allow the overhead crane to be positioned above any area in which coils can be placed. The trolley has a reel that allows raising and lowering of an object fastener such as a hook or a magnet, for example. The object fastener is connected to the trolley by a cable and the object fastener is raised and lowered by winding and unwinding hhe cable connected to the reel of the trolley.

In conventional practice, coils are placed in rows, and, in some storage areas, a second and even third layer of coils are stacked vertically. Each coil is identified by a tag affixed thereto, or by markings directly on the coil. Unfinished coils may be selected for further processing in a specific order on the basis of the requirements of the next process. For example, different coils may be selected so that the width of strip in a rolling mill progressively decreases between successive coils, or to allow progressive increase of the acidity of a liquid in tubs of a pickling line.

In conventional practice, a particular coil is located by a person, called a stocker, who moves on foot through the storage area and manually locates each of the required coils. When the coil has been located in this manner, the person then signals a crane operator to position the crane above the coil. If the crane is not available to pick up the coil, the coil is marked on the top thereof for identification and later retrieval by the crane operator. This is a cumbersome, unsafe, and time-consuming operation. Consequently, the production schedule for further processing of coils frequently cannot be maintained because the coils cannot be located and retrieved in an expeditious manner.

It is accordingly a primary object of the present invention to provide a method for locating and retrieving randomly placed objects without requiring manual discovery of their location.

A further, more specific object of the invention is to provide a method for locating coils so that a coil can be picked up by an overhead crane wherein the crane bridge, trolley, and object fastener may be moved to the proper position for pickup of the desired coil without manually locating the coil and subsequent signalling to the crane operator with respect to the location of the coil.

SUMMARY OF THE INVENTION

In accordance with the present invention there is provided a method for locating and retrieving a randomly placed object. The method includes the steps of interrogating a previously created data base by entering the indicia of identification. The software returns the X, Y, Z location of the object. These coordinates can then be supplied to the retrieval vehicle operator. The method includes building the data base by the prior steps of attaching an indicia of identification to each object to be randomly placed, recording the indicia of identification and determining the coordinates of the location of the object at the time of placement and indexing the coordinates of the object to the indicia of identification. When recovering an object, the additional steps include determining coordinates for the location of a transporting means, comparing the coordinates of the transporting means with the coordinates of the object, and moving the transporting means to the coordinates of the object.

The indicia of identification attached to the object may be a visual indicia and such indicia can be recorded by a camera mounted on the transporting means. Recording and indexing the indicia of identification and the coordinates of location of the object may further be carried out in a computer, while the transporting means may include a land vehicle such as a ram truck or an overhead crane, bridge, trolley and object fastener.

BRIEF DESCRIPTION OF THE DRAWINGS

The invention may be better understood and further advantages and uses thereof more readily apparent when considered in view of the following detailed description of exemplary embodiments taken with the accompanying drawings in which:

FIG. 2 is an isometric illustration of an overhead crane operative above steel coils in a storage area;

DESCRIPTION OF THE PREFERRED EMBODIMENTS

Figure 1:
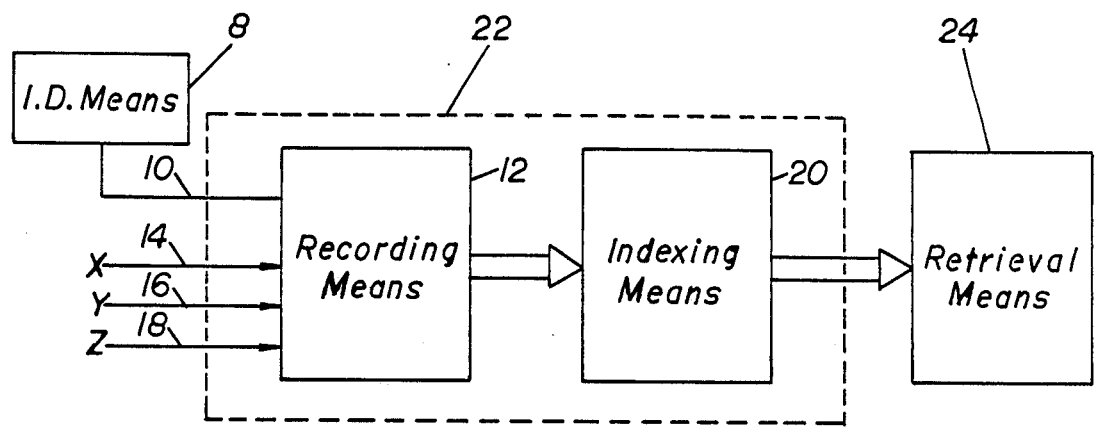
FIG. 1 is a block diagram of one form of apparatus to practice the method of the present invention for locating and retrieving a randomly placed object.

Referring now to FIG. 1, there is shown a block diagram of an apparatus to practice the method of the present invention. In its broadest form, the method consists of identifying an object, placing it at any available open spot, recording the identification, determining the location of the object and creating an index with the object's identification indexed to the location of the object. An identification means 8 allows a determination of the identity of an object. The object identity, as determined by the identification means 8, is inputted by line 10 to a recording means 12. Also inputted to the recording means 12 is the location of the identified object. The location of the object may be expressed as coordinates of a coordinate system, such as coordinates X, Y, and Z of a Cartesian coordinate system. These coordinates are recorded by the recording means 12 through lines 14, 16, and 18 indicating the X, Y, and Z coordinates of the object, respectively. After recording, the coordinates of the object and the identification of the object are correlated by an indexing means 20. Both recording and indexing may, for example, be accomplished by a computer, identified by reference numeral 22 and encompassing both the recording means 12 and the indexing means 20. The computer 22 allows recording of data in a computer data base and indexing by simple software manipulation. The indexed information of the coordinates of the location of the object may be accessed at a later point in time, thereby allowing quick retrieval of the object. Retrieval of the object may be accomplished by retrieval means 24 which may be any of many types of retrieval devices.

While the apparatus shown by FIG. 1 is useful in many different applications, described henceforth is a specific application of the method as applied to a storage bay containing steel coils. The steel coils are randomly stored in the bay awaiting further processing or shipment to a customer.

Shown in FIG. 2 is an overhead crane 26 situated above steel coils 28 in a storage area. The overhead crane 26 is movable in both the X and Y direction of the coordinate system 30 to allow positioning above any location in the storage area. The crane 26 comprises a crane bridge 31 containing girders 32 and 34 upon which tracks 36 and 38 are mounted, respectively. A crane trolley 40 is supported on the tracks 36 and 38 by wheels 42, thereby allowing movement back and forth across the bay in the Y direction. At the extreme ends (one end shown) of the crane bridge 31 are wheels 43 supported by rails 44 running in a direction perpendicular to the length of the crane bridge 31 allowing the crane 26 to be moved back and forth along the bay in the X direction.

The trolley 40 is provided in a conventional manner with a winch for winding and unwinding of cables 45 to which an object fastener 46, such as a hook, is connected. The object fastener 46 connects to a "C" hook 48 to allow lifting of a steel coil 28. Attached to each steel coil 28 is a tag 49 whose markings constitute the indicia identification of a particular coil.

In operation, when a coil 28 is to be picked up by the crane 26, the bridge 31 moves along the rails 44 and the trolley 40 is then moved along tracks 36 and 38 of the bridge 31 to a position above the coil 28, whereupon the "C" hook 48 is lowered by cable 45 for connection to the coil 28.

Figure 3:
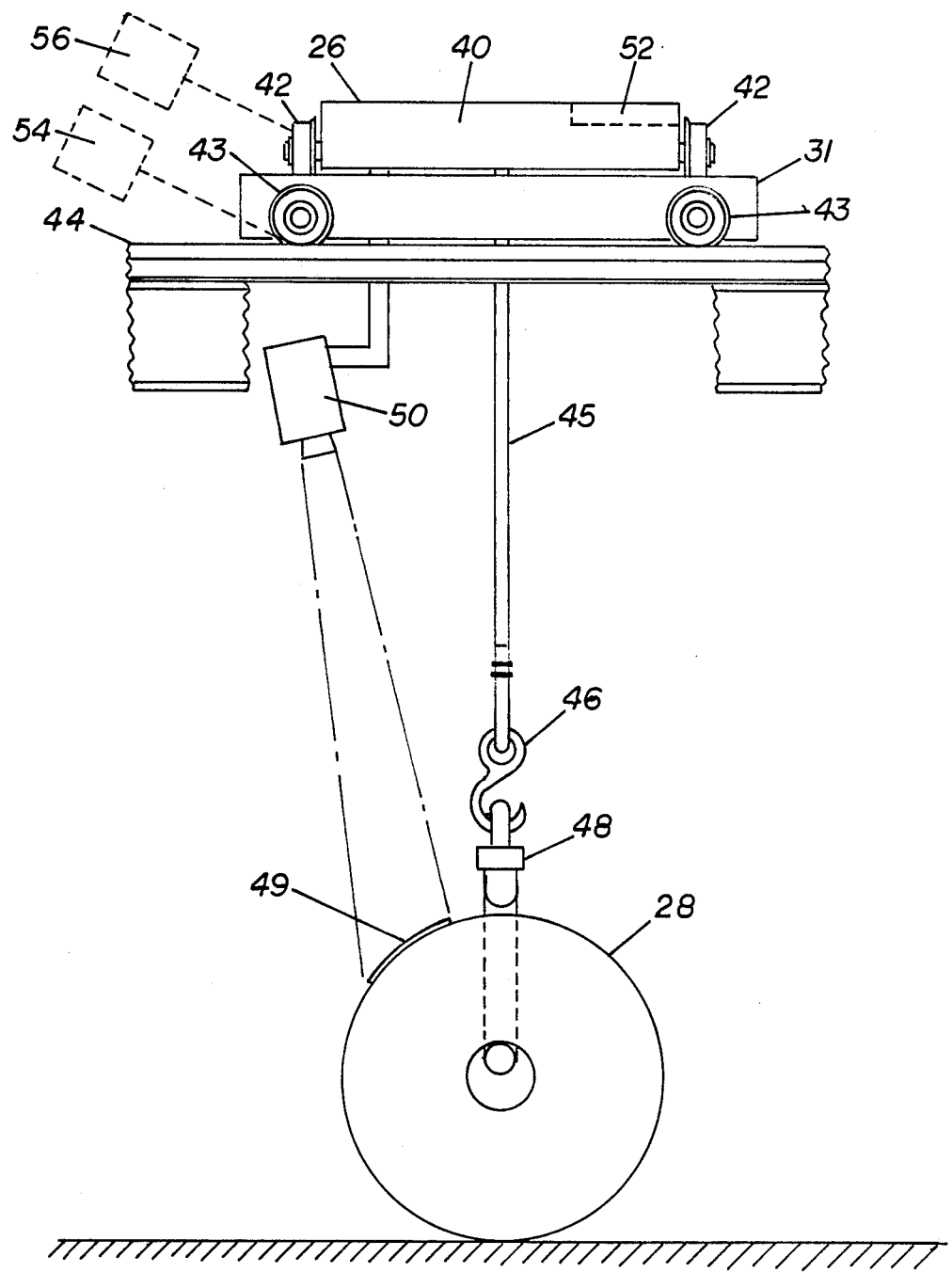
FIG. 3 is an elevational view of a further embodiment of apparatus to carry out the present invention as applied to a storage area containing steel coils.

Referring now to FIG. 3, there is shown schematically an embodiment of the present invention applied to the above-described warehouse which allows location and retrieval of a steel coil 28 randomly placed by an overhead crane in a storage area. The overhead crane 26 is shown in elevation, with the Y direction of the coordinate system perpendicular to the plane of the illustration. The crane bridge 31 may be moved back and forth in the X direction, which is from left to right and vice-versa as one views FIG. 3. Also shown in FIG. 3 is a video camera of a vision system 50 connected to the crane trolley 40. The video camera 50 functions to record the indicia of identification of the steel coil 28. This indicia of identification is placed in a position readable by the camera 50 by means of tag 49, for example.

Various specific practices may be used to identify the steel coil 28 as well as the position of the overhead crane 26. For example, the identity of the coil 28 may be determined at the time of placement by the vision systems. By recording the digitized location of the overhead crane 26, in terms of the position of the crane bridge 31 (the X coordinate), the position of the crane trolley 40 (the Y coordinate), and the position of the hook 48 (the Z coordinate), at the instant in time when the steel coil 28 is placed in its storage position, the digitized information of the coordinate at this instant in time of the overhead crane 26 may be recorded in a computer data base and indexed by computer software to the identity indicia, thereby providing an indexed record of the identity and of the position of the steel coil 28.

If the steel coil 28 is picked up and moved to another location in the storage warehouse, the new position of coil at the time of placement is recorded in the computer data base. The indicia of identification on the tag 49 is first recorded by the camera 50, and the coordinates for the bridge 31, trolley 40, and hook 48 of the crane 26 are determined, recorded, and indexed to the indicia of identification of the tag 49 located on the coil so that the location of the steel coil 28 may be updated. In this manner, determination of the crane position and the indexing thereto to the indicia of identification of the steel coil 28 is maintained on a continual basis.

The crane 26 may be operated either manually to position it at a desired location or, alternatively, automatically in response to a computer output.

In the simplest embodiment of the invention, a crane operator uses a keyboard to input into a computer 52 the indicia of identification located on the tag 49 of steel coil 28 after viewing the picture from the video camera 50. The operator also enters into the computer 52 a visual estimate of the location of the overhead crane 26 when the steel coil 28 is placed in its storage position. A referenced location is thereby established which can be used later to locate and retrieve the coil 28. The operator can then operate a retrieval device such as a vehicle or crane for movement of the retrieval device to the retrieval location.

In a more sophisticated embodiment, a display in the crane cab of the X, Y, and Z coordinates of the crane position is available at all times, allowing the crane operator to input the coordinates by a keyboard into the computer 52 each time a coil 28 is placed in a storage location. Further, this input may be entered into the computer 52 automatically by electronic means rather than manually by the crane operator. The video camera 50 may further include a microprocessor with character recognition software, thereby avoiding all manual entry by the crane operator. With such electronic inputs to the computer 52, the only additional duties of the crane operator are to position the coil 28 to ensure that during storage the tag 49 is always in the field of view of the camera 50, and to initiate recording of the location of the coil 28. By simply pushing a "PLACE" button, at the instant in time when the coil 28 is placed in its storage location, the identity and location of the coil 28 may be inputted to the computer 52.

Although various equipment is commercially available for use to practice the present invention, the following is a description of specific apparatus suitable for use. A vision system to "see and read" the indicia of identification, such as a tag, on the object to be located, picked up, or otherwise retrieved, may be a reading system, per se, is well known in the optical character reading art. This vision system "sees" and displays on a screen the indicia of identification and also outputs the indicia of identification in computer readable form. The indicia may be stored in any conventional microcomputer which may be located directly in the crane cab.

In an embodiment in which an overhead crane 26 is the retrieval means, a rotatable, preferably a non-driven wheel on the crane bridge 31 and a rotatable, preferably a non-driven wheel on the trolley 40 may be coupled to pulse generators 54 and 56, respectively, which delivers pulsed outputs to a microcomputer corresponding to the rotary motion of the wheels according to the location of the bridge 31 and trolley 40. To record the vertical (Z) coordinate in a storage area in which coils are stacked upon one another, the crane operator may be given a series of numbered "PLACE" buttons. When the crane 26 is stopped to place a coil 28, the crane operator pushes a first "PLACE" button if the coil is placed on the floor, a second "PLACE" button if the coil is placed in a second layer, and etc. Thus, the vertical location Z has a unique value of 1, 2, etc., depending on the practice in that storage area. When the button is pushed, the microcomputer records which button is pushed, and retains the X and Y values existing at that instant along with the identity of the coil 28.

Figure 4:
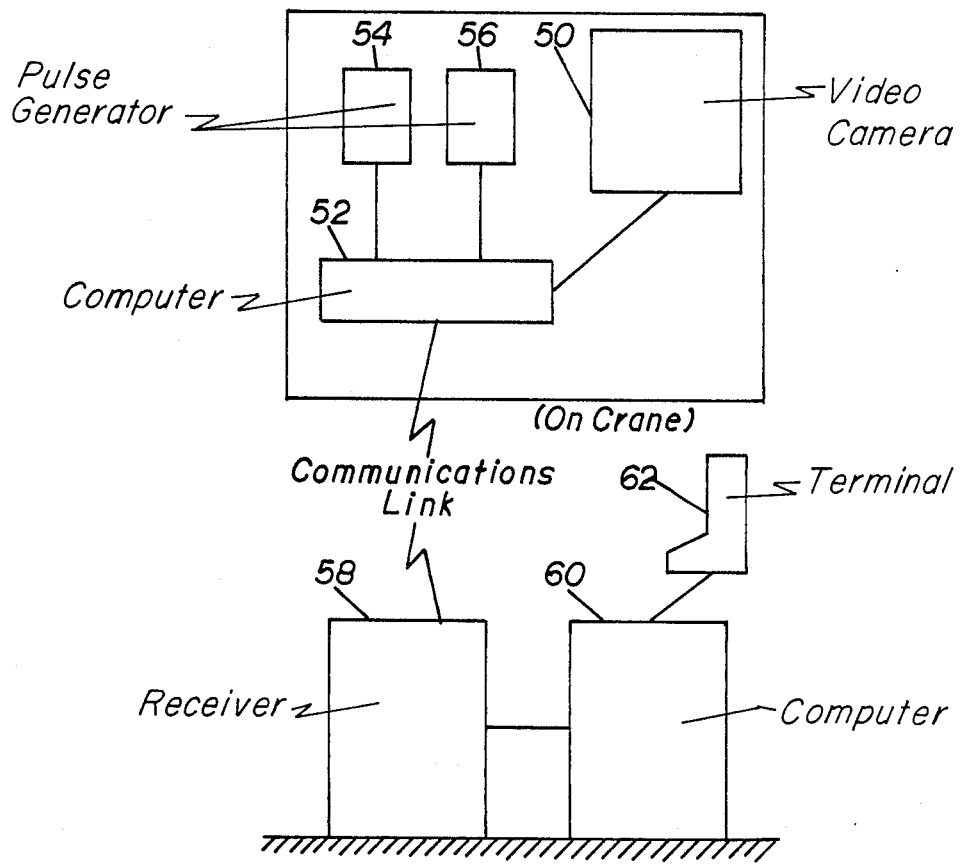
FIG. 4 is a schematic of a further embodiment of apparatus to carry out the method of the present invention in a storage area containing steel coils wherein the indexed coordinates of location of the steel coils are telemetered to a remote computer.

In the fullest embodiment, the indexed information of the identity and location of the coil 28 is telemetered from the computer 52 to a ground base receiver. As shown in the schematic of FIG. 4, the computer 52 is inputted information concerning the identity of the coil 28 from the camera 50, and the coordinates of the position of the crane 26 from the pulse generators 54 and 56. Transmitting means connected to the computer 52 is transmitted to the ground receiver 58. The ground receiver 58 transfers the indexed information to a plant inventory and scheduling oomputer 60 and the information then becomes resident in the data base of the computer. A terminal 62 for the plant inventory and scheduling computer is operative to determine the most expeditious sequencing of coil handling for further processing, and allows quick determination of the location of the entire inventory of coils in the storage areas. By inputting the indicia for coils to be retrieved their location can be given to the operator of the storage vehicle by hand list or by reverse transmission to be displayed on the vehicle operator's CRT.

While the present invention has been described in connection with the preferred embodiment shown in FIG. 3, it is understood that other similar embodiments may be used or modifications and additions may be made to the described embodiment for performing the same functions of the present invention without deviating therefrom. For example, many storage warehouses use ram trucks as opposed to overhead cranes to move the steel coils. It is to be noted, thus, that the teachings of the method of the present invention are applicable to the system regardless as to the exact means of transportation used to move the steel coils. Furthermore, the objects to be moved need not be steel coils, but may be virtually any bulk object sought to be identified and retrieved in any random warehouse. Therefore, the present invention should not be limited to any single embodiment but rather construed in breath and scope in accordance with the recitation of the appended claims.

I claim:

1. The method for identifying the location of a randomly placed object, said method including the steps of:
   applying visual indicia of identification to the object which is to be randomly placed;
   generating and recording electrical signals corresponding to X, Y and Z coordinates of a random storage location of the object by transport means for the object;
   indexing the recorded electrical signals of the visual indicia with the electrical signals of the X, Y, and Z coordinates of the random storage location thereby creating an index; and
   accessing said index to identify, locate and retrieve the object from the random storage location.

2. The method of claim 1 wherein the recording of said indicia of identification is by a camera.

3. The method of claim 2 wherein the camera includes a video camera.

4. The method of claim 2 wherein the recording of said indicia of identification by the camera is inputted to a computer data base.

5. The method of claim 1 wherein said transporting means includes an overhead crane, bridge trolley, and object fastener.

6. The method of claim 5 wherein said overhead crane allows transporting of the objects in the X direction.

7. The method of claim 5 wherein said bridge trolley allows transporting of the object for random placement in the Y direction.

8. The method of claim 5 wherein vertical translation of the object fasteners allows transporting of the object for random placement in the Z direction.

9. The method of claim 5 wherein said overhead crane allows transporting of the object for random placement in the X direction.

10. The method of claim 9 wherein said bridge trolley allows transporting of the object for random placement in the Y direction.

11. The method of claim 10 wherein vertical translation of said object fastener allows positioning of the object for random placement in the Z direction.

12. The method of claim 1 wherein said transporting means being movable to a position proximate to the position of the randomly placed object by reading the X, Y, and Z coordinates of the object from said index.

13. The method of claim 12 wherein the indicia of identification includes a visual indicia.

14. The method of claim 13 wherein the recording of said indicia of identification is by a camera.

15. The method of claim 14 wherein the camera is mounted on the transporting means.

16. The method of claim 12 including the further step of attaching a position-indicator to said transporting means.

17. The method of claim 16 wherein the coordinates of the randomly placed object are determined by recording the coordinates of the transporting means as determined by said position-indicator at the point in time that the transporting means places the object at a storage location therefore.

18. The method of claim 17 wherein the transporting means is moved to a position to allow moving of the object by determining the coordinates of the object from said index, and moving the transporting means to the coordinates of the object.

19. The method of claim 18 wherein the recording of said indicia of identification is by a camera.

20. The method of claim 19 wherein the recording of said indicia of identification by the camera is inputted to a computer data base.

21. The method of claim 19 wherein the camera is mounted on the transporting means.

22. A method of locating transporting means proximate to a randomly stored object to be moved by said transporting means said method comprising the steps of:

applying visual indicia of identification on the object;

recording electrical signals corresponding to said visual indicia of identification;

determining a coordinate in the x direction for a random storage location of the object by determining the coordinate in the x direction for the location of the transporting means;

determining a coordinate in the y direction for a random storage location of the object by determining the coordinate in the y direction for the location of the transporting means;

determining a coodinate in the z direction for a random storage location of the object by determining the coordinate in the z direction for the location of the transporting means;

indexing said coordinates in the x, y, and z directions, respectively, to the recorded electrical signals corresponding to visual indicia of identification, thereby creating an index; and using the index to locate and retrieve the object from the randomly selected storage location.

23. The method of claim 22 wherein said transporting means includes an overhead crane, bridge trolley, and object fastener.

24. The method of claim 22 which includes the further step of attaching a position-indicator to said transporting means.

25. The method of claim 24 wherein said determining coordinates for a random storage location includes recording the coordinates of the transporting means at a point in time when the transporting means places the object at the random storage location.

* * * * *